Nov. 16, 1971  M. E. BROWN ET AL  3,620,077
APPARATUS AND METHOD FOR MONITORING BOTTOMHOLE
DIFFERENTIAL PRESSURE IN A WELLBORE
Filed March 20, 1970  7 Sheets-Sheet 1

Morton E. Brown
Darrell W. Williams
Albert B. Crownover, Jr.
INVENTORS

BY Eugene S. Coddou
ATTORNEY

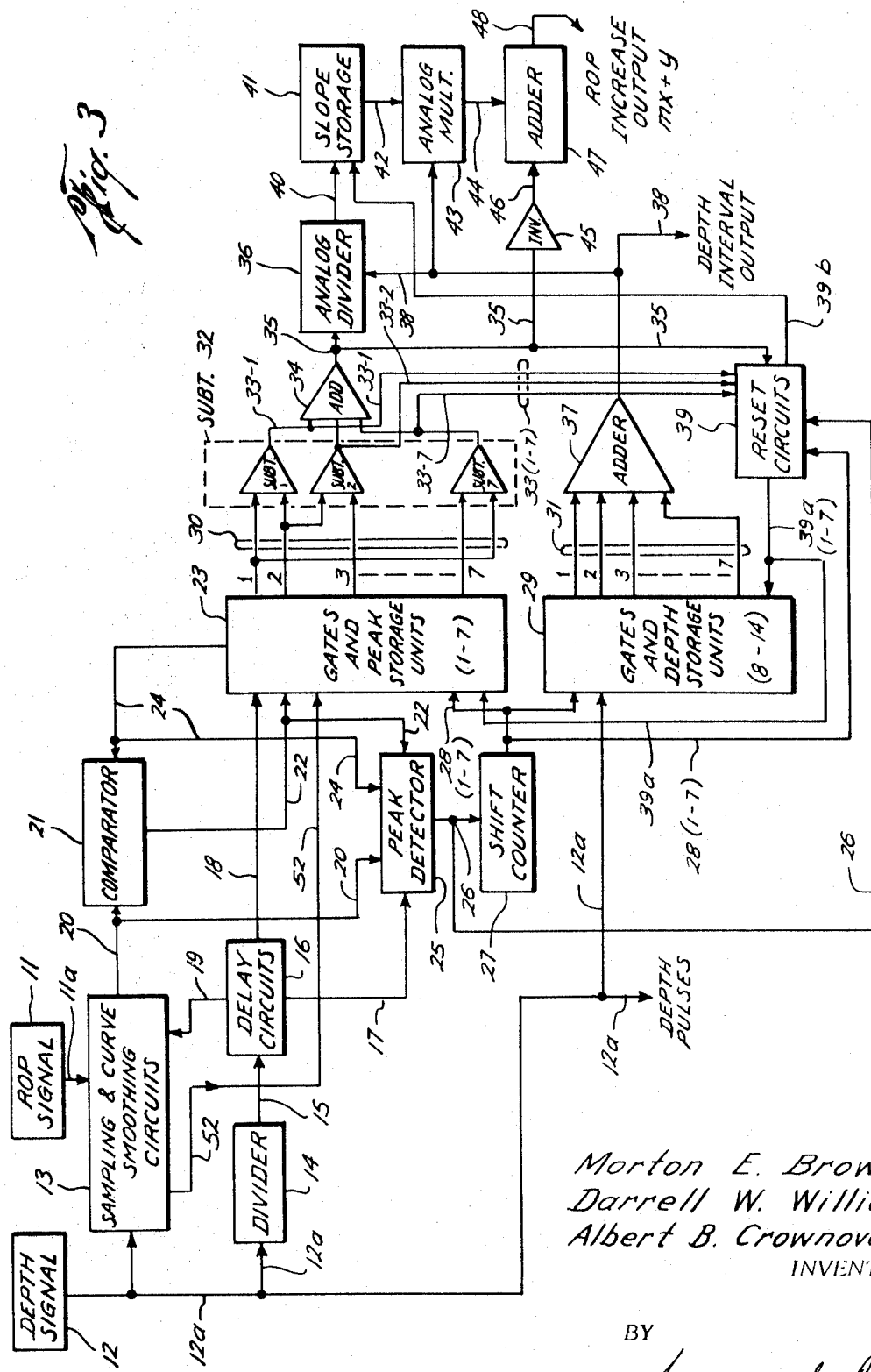

Nov. 16, 1971     M. E. BROWN ET AL     3,620,077
APPARATUS AND METHOD FOR MONITORING BOTTOMHOLE
DIFFERENTIAL PRESSURE IN A WELLBORE
Filed March 20, 1970     7 Sheets-Sheet 3

Morton E. Brown
Darrell W. Williams
Albert B. Crownover, Jr.
INVENTORS

BY
Eugene A. Coddou
ATTORNEY

Morton E. Brown
Darrell W. Williams
Albert B. Crownover, Jr
INVENTORS

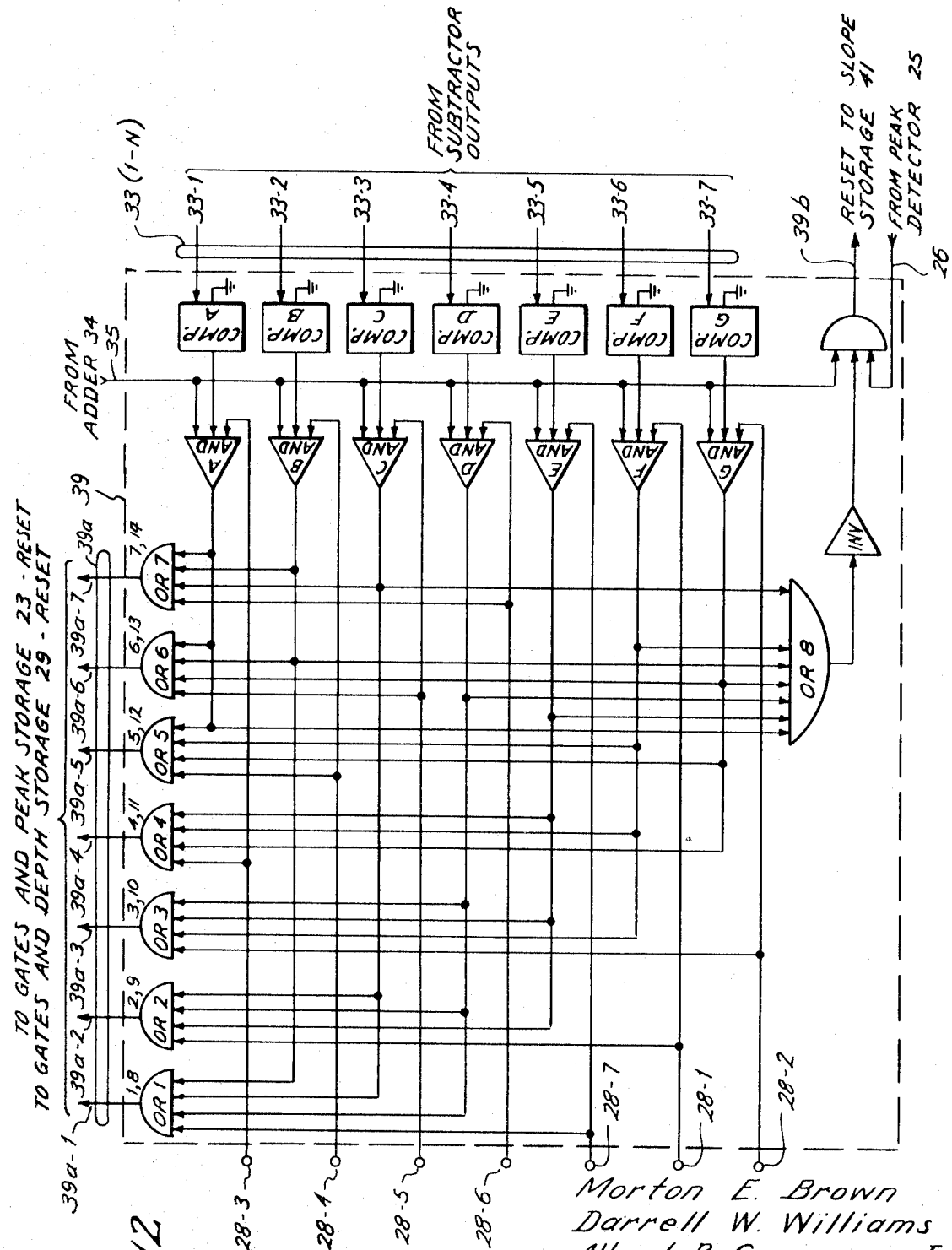

United States Patent Office 3,620,077
Patented Nov. 16, 1971

3,620,077
APPARATUS AND METHOD FOR MONITORING BOTTOMHOLE DIFFERENTIAL PRESSURE IN A WELLBORE
Morton E. Brown, San Antonio, Tex., Darrell W. Williams, Newport News, Va., and Albert B. Crownover, Jr., Lafayette, La., assignors to Tenneco Oil Company, Houston, Tex.
Continuation-in-part of application Ser. No. 852,057, Aug. 2, 1969, which is a continuation-in-part of application Ser. No. 688,393, Dec. 6, 1967. This application Mar. 20, 1970, Ser. No. 21,247
Int. Cl. E21b 45/00
U.S. Cl. 73—151.5                                14 Claims

ABSTRACT OF THE DISCLOSURE

Apparatus and method for detecting and computing the magnitude of change in the rate of penetration in a wellbore being drilled with a drill string and drill bit with drilling mud being flowed therethroough. Included are means for determining the bottomhole pressure differential between the hydrostatic pressure of the mud and the formation pore pressure by reference to the change in rate of penetration of the bit. The system has particular use in computing incipient well blowout conditions and predicting the depth at which blowout could occur if conditions remained unchanged.

---

This invention as a continuation-in-part of copending application Ser. No. 852,057 now abandoned entitled "System for Monitoring Bottomhole Differential Pressure in a Wellbore" by Morton E. Brown et al., filed Aug. 2, 1969, which application is a continuation-in-part of copending application Ser. No. 688,393 now U.S. Patent 3,517,553 entitled "Method and Apparatus for Measuring and Controlling Bottomhole Differential Pressure while Drilling" by Darrell W. Williams et al., filed Dec. 6, 1967, said applications being assigned to the same assignee as the present application.

BACKGROUND OF THE INVENTION

Field of the invention

This invention relates to an apparatus and method for detecting and computing the magnitude of change in rate of penetration of a drill bit in a wellbore, such as an oil well being drilled with drilling mud. More particularly, the invention relates to an apparatus and method for detecting this magnitude of change in rate of penetration, and from this determining the differential pressure between hydrostatic mud pressure and pore pressure and in turn determining actual bottomhole differential pressure. The invention has particular importance in its ability to compute and detect incipient blowout conditions and predict the depth at which blowout could occur. The relationship of rate of penetration increase to borehole differential pressure, when other conditions are normalized, has been described previously in the aforesaid patent applications and will not be repeated herein, except to the extent necessary to understand the present invention.

Description of the prior art

A critical problem in the drilling of high pressure oil an gas wells is the accurate prediction of an impending blowout. Blowouts are frequently caused by insufficient hydrostatic pressure to offset formation pressures at the bottom of a borehole. If formation pressures are increasing with depth at a rate faster than the hydrostatic pressure, an absolute depth will be reached where the pressure differential will reach zero and a blowout may occur.

There have been many attempts to develop automatic drilling devices which would detect incipient blowout conditions. However, none of these heretofore have been particularly successful because of lack of knowledge concerning blowouts generally and the conditions under which they are likely to arise.

During the drilling of an oil well, it has become common knowledge that high pressure formations are generally trapped below shale formations.

One method has been developed for determining the top of abnormal formation pressures and this method is generally taught in U.S. Patent No. 3,368,400, issued to Jorden, Jr. et al., which is generally representative of the state of the art in connection with this invention. However, none of the prior art apparatus and method permits the determination of actual bottomhole differential pressure, nor has means for providing information concerning the correct mud weight to be used to maintain a predetermined differential pressure, nor the depth to zero differential pressure if mud weight remains unchanged, as the present application teaches.

SUMMARY OF THE INVENTION

It is therefore an object of this invention to provide an improved apparatus and method for monitoring differential pressure in a wellbore being drilled with a drill string and drill bit therein and with drilling mud being circulated therethrough, which provides information concerning the bottomhole differential pressure which was not heretofore available with the prior art systems and methods.

As explained in the aforesaid patent applications, there was discovered a direct relationship between the magnitude of change in the rate of penetration of the drill bit and the change in bottomhole differential pressure, when other operating conditions were normalized. The present invention is directed to an improvement which utilizes that discovery and includes first means for monitoring the actual rate of penetration of the bit and generating a first signal representative thereof. It also includes second means for monitoring the change in depth of the borehole and generating a second signal representative thereof. It also includes third means operably connected to the first and second means and responsive to the first and second signals for generating a third signal representative of the magnitude of an increase in the actual rate of penetration above the expected rate of penetration of the bit along an interval of depth of the borehole.

The third means for generating the third signal preferably includes fourth means operably connected to the first and second means and responsive to the first and second signals for generating a fourth signal representative of change in the actual drilling rate during a drilling depth interval. The third means also includes fifth means operably connected with the second and fourth means and responsive to the second signal for generating a fifth signal representative of the drilling depth interval.

It is also preferred that the invention include sixth means operably connected with the third and fourth means and responsive to the third and fourth signals for generating a sixth signal representative of the magnitude of an increase in the actual rate of penetration above the expected rate of penetration of the bit.

The method of this invention includes monitoring the actuate rate of penetration of a drill bit during drilling and detecting as a first point the point of increase in the actual rate of penetration. The method also includes projecting an expected rate of penetration of the bit through formations between the first point and a second point below the first point by reference to the actual rate of penetration above the first point. In addition, the method includes determining the magnitude of deviation between the projected or expected rate of penetration and the actual increased rate of penetration at the second point and determining the actual bottomhole pressure differential at the second point as a function of the magnitude of deviation. The method may also include determining the drilling mud weight necessary to maintain a preselected bottomhole differential pressure in the well at depths below the second point.

BRIEF DESCRIPTION OF THE DRAWINGS

Reference to the drawings will further explain the invention wherein like numerals refer to like parts and in which:

FIG. 3 is a block diagram of one form of the rate of penetration (ROP) increase computer portion of this invention.

FIG. 12 is a block diagram in greater detail of reset circuit 39 shown in FIG. 3.

DESCRIPTION OF THE PREFERRED EMBODIMENT

Figure 9:
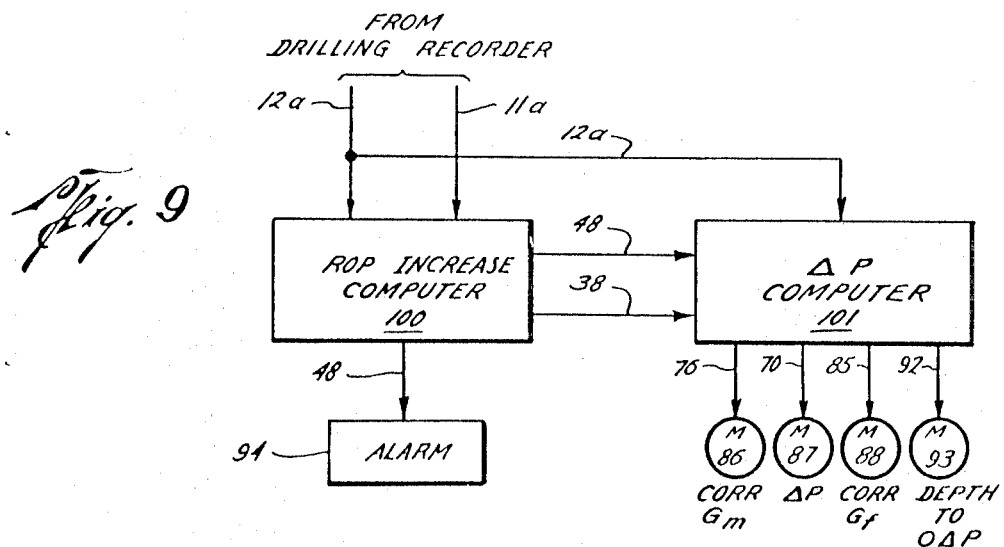
FIG. 9 is a block diagram showing the over-all arrangement of the system and the relationship of ROP increase computer 100 and ΔP computer 101.

Referring first to FIG. 9, there is illustrated the overall arrangement of rate of penetration (ROP) increase computer 100 in relationship to differential pressure (ΔP) computer 101. ROP increase computer 100 is designed for use in conjunction with a standard drilling recorder which records at least the rate of penetration of the drill bit and depth, but may also record hook load, r.p.m., pump pressure, etc.

Figure 1:
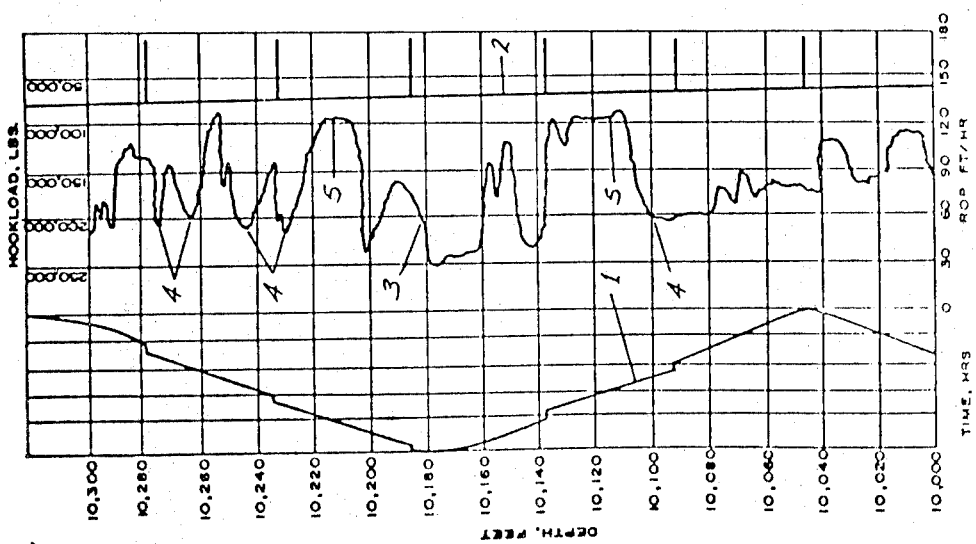
FIG. 1 is a typical strip chart log from an oil well recorder which is arranged to record rate of penetration, elapsed time and hook load.

A typical strip chart log from an oil well recorder is shown in FIG. 1. Borehole depth is indicated by a scale at the extreme left of the chart. Elapsed time (trace 1) is indicated by the scale at the lower left of the chart, rate of penetration (trace 3) by the scale at the lower right, and total hook load (trace 2) by the scale at the top of the chart. Magnitude of the scales shown are variable and are adjusted to fit a particular drilling operation. The parameters of primary interest in this invention will be borehole depth and rate of penetration (trace 3).

The rate of penetration (trace 3) shows the downward progress of the drill bit through subterranean formations. For a given hook load, drill r.p.m. and mud density at any one time during a drilling operation, the ROP varies, increasing and decreasing, depending upon the type of formation penetrated. Shale formations are recognized as the slowest ROP peaks, indicated, for example, at 4. Peaks 4 may sometimes be referred to herein as low points in the rate of penetration. Less compact formations are penetrated faster and are shown as faster ROP peaks 5. It should be noticed that ROP peaks 4 follow a particular trend of pattern; i.e., peaks 4 are generally moving to the left between depths of 10,000 and 10,180 feet, to the right between depths of 10,180 and 10,260 feet, and again to the left at depths below 10,260 feet. The trend, and change of trend, in ROP peaks 4 is indicative of changes in bottomhole differential pressure and is the premise which this invention utilizes.

One of the purposes of the system described herein is to follow or monitor the rate of penetration (trace 3) shown in FIG. 1 and automatically compute and predict the depth to an impending differential pressure overbalance or blowout. In addition to this blowout prediction, other parameters important to the drilling operation are also computed; these are (1) actual bottomhole differential pressure (ΔP), (2) corrected mud density to maintain a desired or preselected ΔP, and (3) the corrected or actual formation pressure gradient during abnormal conditions.

Description of the system will be divided into two major parts which are shown in the working relationship in FIG. 9. These parts will hereafter be referred to as the rate of penetration (ROP) increase computer 100 and the differential pressure (ΔP) computer 101; both of which are constructed as separate units, but are used in conjunction with each other. ROP increase computer 100 monitors an ROP signal representing the ROP curve (trace 3, FIG. 1), and computes the magnitude of ROP increase plus the interval of depth over which the increase occurred. Output of ROP increase computer 100 is directed to ΔP computer 101 which predicts depth to blowout, actual bottomhole ΔP, corrected mud density for preset ΔP, and corrected formation pressure gradient. Additional explanation of the computation process is presented in the following sections of the disclosure.

ROP INCREASE COMPUTER

Figure 2:
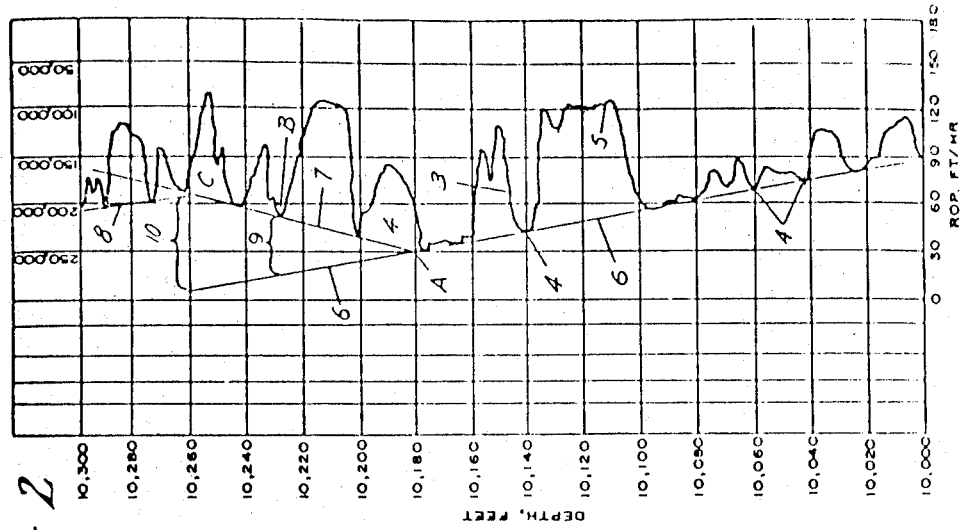
FIG. 2 is similar to FIG. 1, but having the hook load and elapsed time trace left off and with certain base lines added thereto.

The ROP increase computer is designated to monitor an ROP signal representing an ROP curve similar to the one shown in FIG. 1 and to automatically compute the increase in rate of penetration. FIG. 2 shows a rate of penetration (trace 3) with base line added [elapsed time (trace 1) and hook load (trace 2) have been left off the drawing for simplicity]. A shale base line 6 is derived to depict the expected linear rate of ROP decrease through successive shale formations with increase in depth as indicated by peaks 4. It is apparent from FIG. 2 that during the depth interval of 10,000 feet to 10,180 feet, the ROP is decreasing. Over that interval, base line 6 is therefore an indication of the ROP decrease through the shale indicator formations with increased depth. From 10,180 feet (point A) downward, base line 6 depicts an expected or projected ROP decrease. However, at 10,200 feet on the chart, the shale ROP peaks 4 begin to show an increase in ROP. A second shale base line 7 can be derived to show the rate of ROP increase through successive shale formations starting at 10,180 feet as shown at point A. At depths below 10,260 feet, the shale formation peaks 4 again indicate a decrease in ROP and a third shale base line 8 can be derived starting at point C. An extension of base line 8 represents an expected or projected rate of penetration for continued drilling. An additional line can be drawn which intersects base lines 6 and 7 at a depth of 10,230 feet as indicated at point B. The magnitude of deviation between the expected or projected ROP, as indicated by base line 6 at point B, and the actual ROP, as indicated by base line 7 at point B, is shown as interval 9. At point C, the ROP begins to decrease relative to the rate shown by base line 7 and is indicated at subsequent depth by base line 8. The magnitude of deviation between the expected or projected ROP, as indicated by base line 6, and the actual ROP, at point C, is shown as interval 10. Both intervals 9 and 10 are therefore the magnitude of ROP increase from a normal decreasing base line such as those indicated by base lines 6 or 8.

The purpose of ROP increase computer 100 is to monitor or follow a signal representing the rate of penetration shown in curve 3, to compute the decrease in base line 6 from indicator peaks 4, and to automatically determine the magnitude of intervals 9 and 10 whenever an increase in base line 7 exists. In addition, computer 100 must determine the borehole depth interval through which the ROP increase interval occurred; i.e., the depth interval A to B in the case of ROP increase interval 9, or the depth interval A to C in the case of ROP increase interval 10.

One form of ROP increase computer 100 is an electronic device requiring an analog voltage input which is proportional to rate of penetration, and a depth signal for each foot of borehole drilled. Since most of the more commonly used drilling recorders are entirely mechanical and provide no electrical outputs, retransmitting devices must be added to the recorder by which an electrical ROP signal and depth signal may be obtained. Any of a variety of retransmission devices may be used, and the type selected will depend upon the type of drilling recorder employed.

Figure 4:
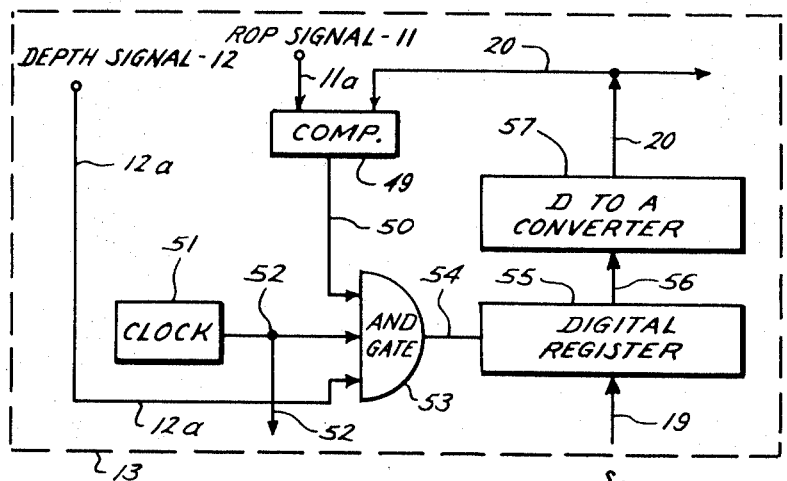
FIG. 4 is a block diagram in greater detail of the sampling and curve smoothing circuit 13 shown in FIG. 3.

A block diagram of one such form of ROP increase computer 100 is shown in FIG. 3. ROP signal source 11 produces an electrical analog voltage on conductor 11a which is inversely proportional to rate of penetration. One suitable form of ROP signal source 11 is manufactured by Bourns, Inc. of Riverside, California, and bears model No. 3560–S–1–502. Depth signal source 12 produces electrical pulses on conductors 12a at the rate of one pulse per foot of borehole depth drilled. One suitable form of depth signal source 12 is manufactured by W. & L. E. Gurley Company of Troy, N.Y., and bears model No. 8602–1. Sampling and curve smoothing circuit 13 samples the ROP analog voltage 11a at one foot depth intervals and stores the maximum sample voltage during the sampling intervals. The sampling interval may be adjusted to provide optimum curve smoothings for particular drilling conditions or applications. A more detailed diagram of circuit 13 is shown in FIG. 4. ROP voltage 11a is applied to voltage comparator 49. If line 11a is positive with respect to line 20, a positive logic signal is applied to "and" gate 53 through line 50. Clock signals 51 are continuously applied to "and" gate 53 through line 52. As each foot of depth is drilled, depth signal 12a is applied to "and" gate 53, activating gate 53 for the depth pulse interval. Output of gate 53 is a series of clock pulses through line 54 to digital register 55. Binary output from digital register 55 is applied through line 56 to the digital-to-analog (D to A) converter 57. The output of D to A converter 57 is applied through line 20 to comparator 49. When D to A voltage 20 equals ROP voltage 11a, the comparator 49 switches and logic voltage 50 is removed from "and" gate 53. Clock pulses 52 are therefore shut off to line 54 and the level stored in D–A converter 57 is equal to the ROP voltage 11a. Comparator 49 allows the level in D to A converter 57 to change only when the voltage level on line 20 is less than the level applied through line 11a. By this means, the maximum ROP voltage during any one sampling interval is stored in D to A converter 57. At the end of each sampling interval, digital register 55 is reset from line 19 and the cycle is repeated.

The sampling interval may contain any number of depth pulses. The optimum interval will depend on the specific application and the degree of curve smoothing required. Referring again to FIG. 3, the specific sampling interval is determined by divider 14. If, for example, a sampling interval of 20 depth pulses or 20 feet is desired, divider 14 is set to produce one output pulse on line 15 for each 20 input pulses on line 12a. A pulse on line 15 is propagated through delay circuit 16 and line 18 to gates and peak storage units 23, through line 17 to peak detector 25, and through line 19 to sampling and curve smoothing circuits 13. The output of sampling and curve smoothing circuit 13 is routed through line 20 to comparator 21 and to peak detector 25. Comparator 21 compares the voltage level of line 20 to that of line 24. If this level on line 20 is greater than that present on line 24, comparator 21 produces a positive logic signal on line 22, which signal is provided to gates and peak storage units 23 and to peak detector 25.

Figure 11:
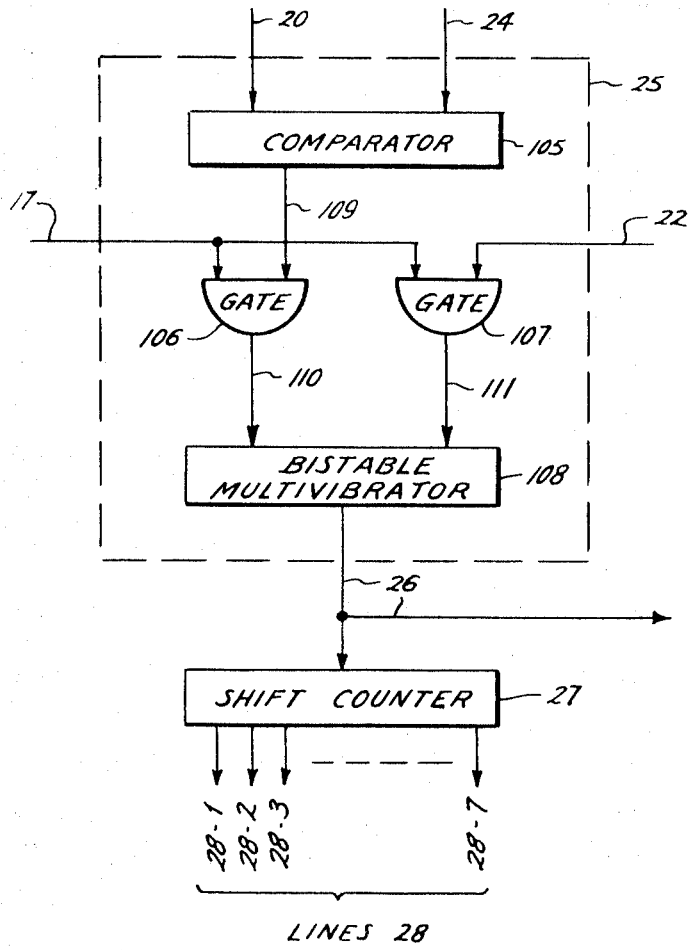
FIG. 11 is a block diagram in greater detail of peak detector 25 shown in FIG. 3.

Peak detector 25, shown in detail in FIG. 11, operates in conjunction with comparator 21 and includes a comparator 105 which operates opposite hand of comparator 21. Comparator 105 provides a positive logic signal on line 109 when the signal on line 24 is greater than that on line 20. The logic signals from comparators 105 and 21 are directed to "and" gates 106 and 107, respectively, and provide conditioning signals to these gates. A depth signal on line 17 is routed through gate 106 or gate 107 to set or reset bistable multivibrator 108. The output from multivibrator 108 on line 26 is used to actuate shift counter 27 and is also provided to reset circuits 39.

Shift counter 27, shown in FIGS. 3 and 11, is composed of a recirculating counter which may have, for instance, seven positions, corresponding to seven gates and peak storage units in units 23 and 29. Shift counter output lines 28 (1–7) are equal in number to the number of positions in shift counter 27 and are connected between each position of shift counter 27 and corresponding gate circuits in units 23 and 29. The output of shift counter 27 on lines 28 (1–7) is also provided to reset circuits 39. An output signal from shift counter 27 is provided on each of lines 28 in sequence.

Figure 5:
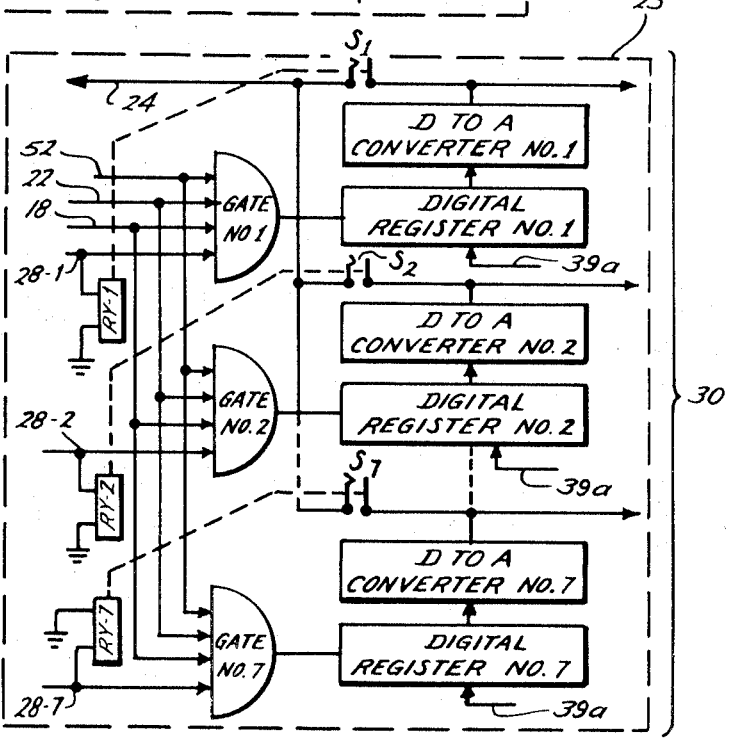
FIG. 5 is a block diagram in greater detail of the gates and peak storage units 23 shown in FIG. 3.

Gate and peak storage unit 23, shown in detail in FIG. 5, is composed of a plurality of gate circuits with one digital register and one D to A converter associated with each gate circuit. In the embodiment shown, there are seven storage units which are capable of storing five separate peaks. A greater or lesser number of storage units may be provided in unit 23 as desired, however. Unit 23 can store only N−2 peaks. At any given time, an ROP signal is being fed to and stored in one of the units and the next unit in sequence has been reset to allow storage of the ROP signal upon receipt of the next shift counter signal.

The voltage level of line 20 is received and stored in a peak storage unit upon coincidence in the gate of the storage unit of signals on lines 18, 22 and 52, with the appropriate shift counter signal on one of lines 28. More specifically (refer to FIG. 5), assume that shift counter 27 is in the number one position providing a positive logic signal on line 28-1 and the switch closure of S1 through repeating relay RY–1. Further assume that logic level 22 is high and a sampling interval pulse appears on line 18. Under these conditions, clock pulses 52 will be routed to storage unit No. 1 composed of digital register No. 1 and D to A converter No. 1, thereby causing D to A converter No. 1 to assume the voltage level of line 20. With the arrival of each additional sampling interval pulse on line 18, storage unit No. 1 will assume the new level of line 20 so long as the line 20 level exceeds that of line 24.

A voltage level on line 20 lower than that present on line 24 will be detected by peak detector 25 as an ROP peak and a logic signal will be transferred through line 26 to shift counter 27. The presence of a logic signal on line 26 transfers shift counter 27 to the next position and energizes storage unit No. 2 through line 28-2 and relay RY–2. The process will then be repeated until an additional peak is stored in storage unit No. 2, at which time shift counter 27 will drop unit 2 and shift to storage unit No. 3. As has been implied, the presence of a peak is established by the presence of an increasing voltage level followed by a decreasing voltage level.

The output of storage units 23 is transmitted through line 30 to subtractors 32. These subtractors are connected differentially to storage units 1 and 2, 2 and 3, 3 and 4, and so on. The output of each subtractor 32 is the difference in level or amplitude between each successive peak pair. The peak differentials are routed through lines 33 to adder 34 and to reset circuits 39. Summation of peak differentials in adder 34 provides a voltage signal or level which is proportional to the difference in amplitude between the first and last peaks in storage units 23. The analog output of adder 34 is applied via line 35 to one input of analog divider 36, inverter 45, and reset circuits 39. The signal on line 35 will maintain a positive value if peaks are increasing with depth or a negative value if peaks are decreasing with depth.

Depth storage units 29 are identical to peak storage units 23. Inputs required to depth gates are a shift signal on lines 28 (1–7) and a depth pulse 12a. As each depth pulse occurs, a proportionate voltage is registered in the appropriate D to A converter. Depth storage units 29 operate in synchronism with peak storage units 23 to record the depth interval between successive ROP peaks; i.e., depth storage unit No. 1 registers the depth interval between peaks 7 and 1, depth storage unit No. 2 registers the depth interval between peaks 1 and 2, and so forth. The proportionate voltages representing each depth interval are then routed through lines 31 and summed in adder 37. The output of adder 37 on line 38 represents the total depth interval between the first and last peaks, just as adder 34 represents the total amplitude change between the first and last peaks. The depth interval signal on line 38 is routed to input No. 2 of analog divider 36, input No. 1 of analog multiplier 43, and to one output terminal of the ROP increase computer.

Figure 6:
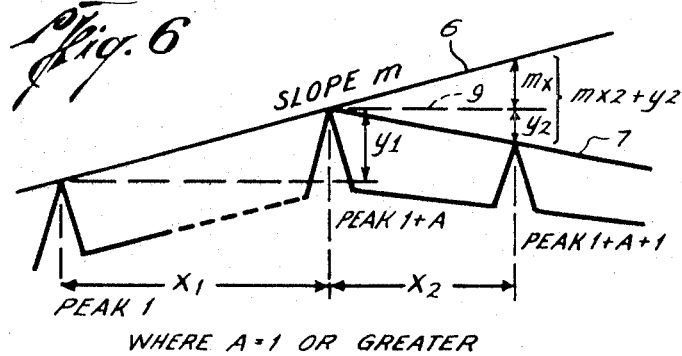
FIG. 6 is an illustration showing the computation of the rate of penetration (ROP) increase interval 9 shown in FIG. 2.

Computation of the ROP increase interval (interval 9, FIG. 2) is illustrated in FIG. 6. $Y_1$ represents the peak differential signal on line 35 at one input to analog divider 36. $X_1$ represents depth interval signal on line 38 at the second input to analog divider 36. The quotient of analog divider 36 is $Y_1$ divided by $X_1$ or $m$, which is the slope of base line 6, FIG. 2. Slope $m$ on line 40 is entered in slope storage 41 and maintained until unit 41 is reset. The storage slope signal on line 42 is multiplied by the depth interval signal on line 38 ($X_1$) in analog multiplier 43. The product, $mX_1$, is entered in adder 47 via line 44. $Y_1$ signal on line 35 is inverted in inverter 45 and added to product 44 in adder 47. The sum signal on line 48 is $mX_1+Y_1$ or the ROP increase output. When $Y_1$ is positive, as shown in FIG. 6, output on line 48 will be zero. Output on line 48 will remain zero as long as interval $Y_1$ remains positive. With the storage of each new peak in storage unit 23, a new value of $m$ will be computed, and, after slope storage unit 41 is reset, this value of $m$ is stored in slope storage 41. A continuing zero output on line 48 indicates a steadily decreasing rate of penetration with depth. Should the rate of penetration begin to increase, as shown by peak $1+A+1$ in FIG. 6, a new sequence of events occurs. Reset circuits 39 are activated and all storage units in 23 and 29, except those containing peaks $1+A$, peak $1+A+1$ and interval $X_2$ are reset, as described below. Interval $Y_2$ signal on conductor 35 assumes a negative value, and after passing through inverter 45, is introduced to adder 47. Product signal on line 44 becomes $mx_2$, and is added to interval $Y_2$ signal in adder 47. The output of conductor 48 becomes a finite value proportional to the ROP increase interval 9 in FIG. 2.

A detailed diagram of reset circuits 39 is shown in FIG. 12. This circuit receives the shift counter signals on lines 28 and the output from subtractors 32 on lines 33. As long as the subtractor outputs remain negative, circuit 39 will reset only the peak storage 23 and depth storage 29 registers next following that in use. For example, with all line 33 signals negative, a signal from shift counter 27 on line 28–3 will cause peak storage unit 4 in unit 23 and corresponding depth storage unit 11 in unit 29 to be reset. However, if the signal on line 33–1 is positive, when shift counter 27 switches to output line 28–3, all registers in units 23 and 29 will be reset except the first three in each, thereby retaining the previous two peaks and the information currently being stored and the corresponding depth information.

Reset circuit 39 also selectively provides a reset signal on line 39b to slope storage unit 41, resetting unit 41 upon storage of each new peak in unit 23, unless inhibited from doing so by a signal on line 35 indicating an increasing ROP. If the last peak indicates an increasing ROP, then the last slope $m$ stored is retained. By retaining the last decreasing ROP slope during the following period of increasing ROP, the decreasing ROP slope is effectively projected to allow a subsequent comparison between the expected or projected ROP and the actual increasing ROP. So long as the rate of penetration continues to increase or ROP base line 7 (FIG. 2) continues in an increasing direction, the ROP increase computer will continue to compute corrected increase intervals such as that shown as interval 10, FIG. 2. When the rate of penetration again begins to decrease, such as shown by base line 8, FIG. 2, output 35 of adder 34 will become positive, slope storage 41 will be reset by a signal on 39b, the new slope of base line 8 will be computed and stored by slope storage 41, and the output of conductor 48 will return to zero.

DIFFERENTIAL PRESSURE COMPUTER

Differential pressure ($\Delta P$) computer 101 is designed to operate in conjunction with ROP increase computer 100 and to automatically compute and readout corrected mud density, actual or absolute bottomhole differential pressure, corrected pore pressure gradient, and depth to zero differential pressure. The theory of the computation utilized in $\Delta P$ computer 101 is discussed in detail in the aforesaid patent applications and will not be repeated. However, certain mathematical relationships and definitions will be restated when necessary. All computations in $\Delta P$ computer 101 have been performed by analog methods for purposes of simplicity. The identical computations could be performed by digital methods with some increase in accuracy, but also with greater circuit complexity.

Figure 7:
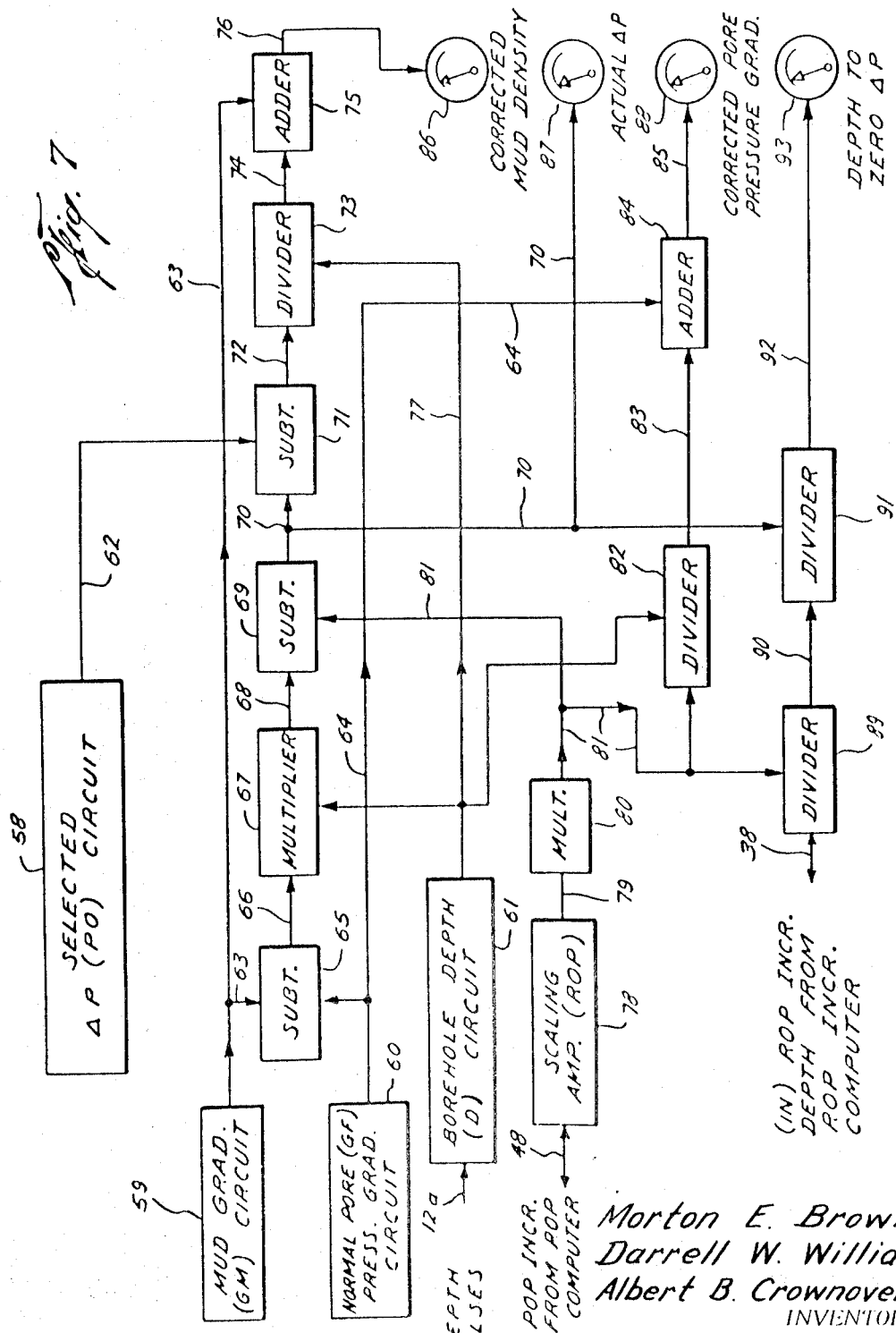
FIG. 7 is a block diagram of the differential pressure (ΔP) computer portion of the system which is designed to operate in connection with ROP increase computer.

A block diagram of $\Delta P$ computer 101 is shown in FIG. 7. Input variables to the computer are depth pulses 12a, ROP increase signal 48 (from ROP increase computer 100), and ROP increase depth signal 38 (from ROP increase computer 100). Functions which must be manually set into $\Delta P$ computer 101 are preselected $\Delta P$ 58, drilling mud pressure gradient 59, and normal formation pressure gradient 60.

The corrected mud density is calculated from the relationship $$W=\frac{\frac{P_o-P_a}{d}+G_m}{0.052}$$

where:

$P_o$=the predetermined differential pressure level desired to be maintained
$P_a$=the actual pressure differential
$d$=the bottomhole depth
$G_m$=the existing pressure gradient of the drilling mud.

The factor 0.052 is used to convert drilling mud pressure gradient to density in pounds per gallon.

Mud pressure gradient ($G_m$) and formation pressure gradient ($G_f$) are set into the computer by direct reading potentiometer controls in circuits 59 and 60. The outputs of circuits 59 and 60 are analog voltages which are directly proportional to each gradient. The output of circuit 59 is directed via conductor 63 to subtractor 65 and adder 75. The output of circuit 60 is directed via conductor 64 to subtractor 65 and adder 84. The output of subtractor 65 is proportional to the difference in pressure gradients; i.e., $G_m-G_f$. The gradient difference is applied via conductor 66 to one input of analog multiplier 67.

Figure 8:
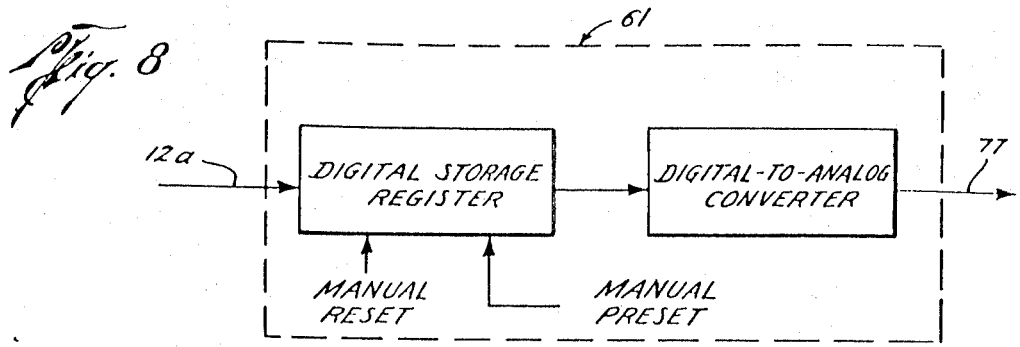
FIG. 8 is a block diagram in greater detail of borehole depth circuit 61 shown in FIG. 7.

Depth pulses 12a from the drilling recorder depth encoder are applied to borehole depth circuit 61. Circuit 61 accumulates the total number of depth pulses and converts these to a DC voltage proportional to total borehole depth (see FIG. 8 for detail). The output of borehole depth circuit 61 is applied via conductor 77 to the second input of analog multiplier 67 and to divider 73. Multiplier 67 provides a voltage which is proportional to the difference in pressure gradient multiplied by borehole depth, or $$(G_m - G_f)d$$

The product of multiplier 67 is the expected pressure differential at the bottom of the borehole as shown by the following equation:

$$P_e = (G_m - G_f)d$$

where:

$P_e$ = the expected differential pressure.

$P_e$ is directed via conductor 68 to one input of subtractor 69.

The ROP increase voltage or signal from ROP increase computer 100 is applied via conductor 48 to scaling amplifier 78. The purpose of scaling amplifier 78 is to adjust the magnitude of ROP increase voltage 48 to coincide with the ROP scale used on the drilling recorder. By referring to FIG. 1, it is seen that the scale of the ROP trace is 0 to 180 feet per hour; this scale is not fixed, but may be changed or adjusted to meet particular drilling conditions. Whatever this full scale value may be can therefore be set into scaling amplifier 78 via direct reading potentiometer control. The scaled ROP voltage, via conductor 79, is multiplied by a constant k factor in multiplier 80. This product can be shown by the following expression:

$$P_d = k(R)$$

where:

$k$ = an empirical constant whose value depends on the geological type of indicator formation being utilized. In the Gulf Coast area, this factor may have a value on the order of 10, for example.
$R$ = the magnitude of ROP increase as computed by the ROP increase computer 100 and shown by interval 9, FIG. 2.
$P_d$ = the magnitude of decrease in bottomhole differential pressure.

The magnitude of the $k$ multiplier is adjusted by a direct reading potentiometer control. The output of multiplier 80 is directed via conductor 81 to the second input of subtractor 69. The output of subtractor 69 is equal to:

$$P_a = P_e - P_d$$

where:

$P_a$ = the absolute differential pressure.

$P_a$ is then directed via conductor 70 to subtractor 71, divider 91, and meter 87. Meter 87 is calibrated to read out directly the corrected or absolute differential pressure at the bottom of the borehole.

The predetermined differential pressure ($P_o$) is manually dialed into the selected ΔP circuit 58 by means of a direct reading potentiometer control. This circuit develops an analog DC voltage which is directly proportional to the desired differential pressure in p.s.i. The output of circuit 58 is applied to subtractor 71 via conductor 62. Subtractor 71 then produces the difference in desired differential pressure and the absolute differential pressure is introduced via conductor 70. The differential pressure difference obtained by subtractor 71 is directed to divider 73 where it is divided by total borehole depth via conductor 77; this quantity can be expressed by the following:

$$P_o - P_a/d$$

The output of divider 73 is directed via conductor 74 to adder 75 where it is summed with the preselected mud pressure gradient ($G_m$) via conductor 63. The total quantity $$\frac{P_o - P_a}{d} + G_m$$

is then directed to meter 86 via conductor 76. The dividing factor 0.052 is incorporated in the meter scaling, such that the corrected mud density (W) is a direct meter reading in pounds per gallon.

The corrected formation pressure gradient ($G_F$) may be expressed as:

$$G_F = \frac{G_f d + P_d}{d}$$

where:

$G_f$ = the predicted formation pressure gradient.
$P_d$ = the magnitude of decrease in bottomhole differential pressure.
$d$ = the bottomhole depth.

The output of multiplier 80 ($P_d$) is applied via conductor 81 to one input of divider 82. The total borehole depth voltage is routed via conductor 77 to the second input of divider 82 such that the quotient of the two variables is $$P_d/d$$

This voltage is then routed via conductor 83 to adder 84 where it is added to the analogous voltage for the predicted formation pressure gradient ($G_f$) via conductor 64. The output voltage of analog adder 84 is directed via conductor 85 to meter 88 which is calibrated for a direct reading of corrected formation pressure gradient in p.s.i. per foot.

The depth to zero differential pressure is defined as the additional depth which can be drilled before the difference in hydrostatic pressure and formation pressure becomes zero. The decreasing bottomhole differential pressure can occur only during an increasing ROP base line, such as that shown by base line 7, FIG. 2. The increasing ROP, if preceded by a decreasing ROP, indicates that the formation pressure is increasing at a more rapid rate than the hydrostatic pressure. When this occurs, a finite depth can be calculated which will predict the point at which the bottomhole differential pressure or pressure difference will be zero. In the case of the decreasing ROP (shown as base line 6, FIG. 2), the hydrostatic pressure is increasing at a rate greater than the formation pressure, resulting in an infinite depth or distance to zero pressure differential.

The additional depth at which zero differential pressure will occur can be shown by the following relationship:

$$d_o = \frac{P_a}{L}$$

where:

$d_o$ = additional depth to zero differential pressure.
$P_a$ = actual differential pressure.
$L$ = the rate of loss of differential pressure.

The rate of loss (L) is defined as:

$$L = \frac{P_d}{D}$$

where:

$Pd$ = the magnitude of decrease in bottomhole differential pressure.
$D$ = the ROP increase depth interval (shown in FIG. 2 as the interval between points A and B).

The ROP increase depth interval voltage as computed by ROP increase computer 100 is applied via conductor 38 to one input of analog divider 89. The output of multiplier 80 ($P_d$) is directed via conductor 81 to the second input of analog divider 89. The output of divider 89 is the quotient of $P_d$ divided by D or the rate of loss (L). The voltage representing rate of loss is directed to analog divider 91 via conductor 90. Also directed to divider 91 is the absolute differential pressure ($P_a$) via conductor 70. Voltage $P_a$, when divided by voltage L, produces a voltage directly proportional to depth $d_o$. Voltage $d_o$ is routed to meter 93 via conductor 92. Meter 93 is calibrated such that a readout in feet to zero ΔP is provided each time an ROP increase is computed.

COMBINED SYSTEM

FIG. 9 illustrates the use of ROP increase computer 100 and ΔP computer 101 as a computer system. Although these two units were described separately, they are arranged for use together to provide information to the drilling operation. ROP increase computer 100 provides the information that an ROP increase (interval 9, FIG. 2) has occurred. ΔP computer 101 is designed to utilize the information supplied by ROP increase computer 100, and to provide outputs indicating actual ΔP, corrected pore pressure gradient, corrected mud density, and depth to zero ΔP. When a bottomhole pressure differential change is detected during drilling, the weight of the mud being circulated through the wellbore may then be varied in response to the detected change to compensate for these formation pressure changes.

Figure 10:
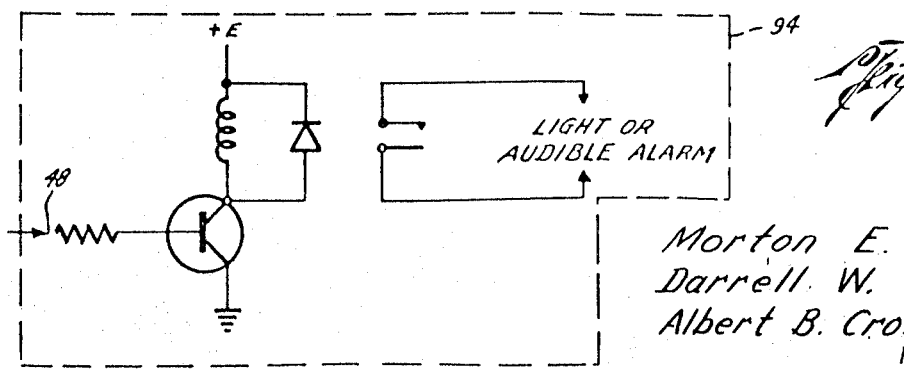
FIG. 10 is a diagram in greater detail of the alarm circuit shown in FIG. 9.

Alarm circuit 94 is added to ROP increase computer 100 to provide a visual or audible indication whenever an ROP increase is present. The alarm consists of a simple transistor switching stage, operating in conjunction with a relay, which is connected to the ROP increase signal through conductor 48 (see FIG. 10). The use of the alarm permits unattended operation during normal drilling operations, yet warns personnel of approaching abnormal conditions.

The method of this invention may be carried out, for example, by monitoring the actual rate of penetration, as by ROP signal source 11, shown in FIG. 3, and generating a first signal 11a representative thereof. The borehole depth may be monitored by a depth signal source 12, which produces a second signal 12a representative thereof. A point of increase in the actual rate of penetration is detected whenever the ROP peaks show an increasing ROP, resulting in a negative output from subtractors 32 and adder 34. When an increase in ROP is detected, the previous decreasing ROP peak slope $m$ which had been stored in unit 41 is retained and becomes a reference slope representing an expected or projected ROP. Using this reference slope $m$ and the current ROP and depth, ROP computer 100 then determines the deviation between the expected ROP and the actual increased ROP and produces a third signal 48 representing the magnitude of an increase in the actual rate of penetration above the expected rate of penetration. ΔP computer 101, shown in FIGS. 7 and 9, receives the output 48 from computer 100 and determines the actual bottomhole differential pressure and produces a signal 70 representative thereof, as described above.

Further modifications and alternative embodiments of the invention will be obvious to those skilled in the art in view of the foregoing description.

We claim:

1. In a system for monitoring borehole conditions in a borehole being drilled with a drill string and drill bit therein and with drilling mud being circulated therethrough, the combination comprising:
    first means for monitoring the actual rate of penetration of said bit in said borehole and generating a first signal representative thereof;
    second means for monitoring the change in depth of said borehole and generating a second signal representative thereof;
    third means operably connected with said first and second means responsive to said first and second signals for generating a third signal representative of the magnitude of an increase in the actual rate of penetration above the expected rate of penetration of said bit along an interval of depth of said borehole.

2. In a system for monitoring bottomhole differential pressure in a borehole being drilled with a drill string and drill bit therein and with drilling mud being circulated therethrough, the combination comprising:
    first means for monitoring the actual rate of penetration of said bit in said borehole and generating a first signal representative thereof;
    second means for monitoring the depth of said borehole and generating a second signal representative thereof;
    third means operably connected with said first and second means and responsive to said first and second signals for generating a third signal representative of change in the actual drilling rate during a drilling depth interval;
    fourth means operably connected with said second and third means and responsive to said second signal for generating a fourth signal representative of said drilling depth interval;
    and fifth means operably connected with said second, third and fourth means and responsive to said second, third and fourth signals for generating a fifth signal representative of the predicted bottomhole differential pressure in said borehole during said drilling.

3. The invention as claimed in claim 2 wherein said fifth means includes: sixth means operably connected with said third and fourth means and responsive to said third and fourth signals for generating a sixth signal representative of the magnitude of an increase in the actual rate of penetration above the expected rate of penetration of said bit.

4. In a method of monitoring borehole conditions in a borehole being drilled with a drill string and drill bit therein and with drilling mud being circulated therethrough, the combination of steps comprising:
    monitoring the actual rate of penetration of said bit in said borehole and generating a first signal representative thereof;
    monitoring the change in depth of said borehole and generating a second signal representative thereof;
    generating a third signal responsive to said first and second signals and representing the magnitude of an increase in the actual rate of penetration above the expected rate of penetration of said bit along an interval of depth of said borehole.

5. In a method of monitoring bottomhole differential pressure in a borehole being drilled with a drill string and drill bit therein and with drilling mud being circulated therethrough, the combination of steps comprising:
    monitoring the actual rate of peneration of said bit in said borehole and generating a first signal representative thereof;
    monitoring the depth of said borehole and generating a second signal representative thereof;
    generating a third signal responsive to said first and second signals and representative of change in the actual drilling rate through a drilling depth interval;
    generating a fourth signal responsive to said second signal and representative of said drilling depth interval;
    and generating a fifth signal responsive to said second, third and fourth signals and representative of the calculated bottomhole differential pressure in said borehole during said drilling.

6. The invention as claimed in claim 5 wherein said step of generating said fifth signal includes: generating a sixth signal in response to said third and fourth signals and representative of the magnitude of an increase in the actual rate of penetration above the expected rate of penetration of said bit.

7. In a method of determining bottomhole pressure differential between formation pressure and hydrostatic mud pressure in a well being drilled with a drill string and bit therein and with drilling mud being circulated therethrough, the steps comprising:
  monitoring the actual rate of penetration of said bit during said drilling;
  detecting as a first point the point of increase in said actual rate of penetration in the wellbore during said monitoring;
  projecting an expected rate of penetration of the bit through formations between said first point and a second point below said first point by reference to said monitored actual rate of penetration above said first point;
  determining the magnitude of deviation between said expected rate of penetration and said actual increased rate of penetration at said second point;
  and, determining predicted bottomhole pressure differential at said second point as a function of said magnitude of deviation obtained during said step of determining magnitude of deviation.

8. The invention as claimed in claim 7 including: varying the mud weight being circulated to said wellbore while drilling in response to detected changes in said predicted bottomhole pressure differential caused by changes in formation pressure.

9. An improvement in the method of drilling a well by rotating a drill string and bit and circulating a flow of drilling mud into and out of the well, said improvement comprising the steps of:
  drilling said well utilizing a predetermined drilling mud weight for maintaining a preselected minimum bottomhole differential pressure in the well;
  monitoring the rate of penetration of the bit;
  determining the expected rate of penetration of the bit through a preselected class of formations between first and second borehole depths by reference to the rate of penetration above said first depth;
  detecting a change in the actual rate of penetration at said first depth during said monitoring;
  determining the magnitude of deviation between said expected and actual rates of penetration at said second depth;
  and, determining predicted bottomhole differential pressure at said second depth as a function of said magnitude of deviation obtained during said step of determining magnitude of deviation between said expected and actual rates of penetration.

10. The method as described in claim 9, including the steps of:
  determining the drilling mud weight necessary to maintain said preselected minimum bottom hole differential pressure in the well at depths below said second depth;
  and, resuming the drilling operation utilizing said newly determined drilling mud weight.

11. In a system for monitoring borehole conditions in a borehole being drilled with a drill string and drill bit therein and with drilling mud being circulated therethrough, the combination comprising:
  first means for monitoring the actual rate of penetration of said bit in said borehole and generating a first signal representative thereof;
  second means for monitoring the change in depth of said borehole and generating a second signal representative thereof;
  third means operably connected with said first and second means responsive to said first and second signals for generating a third signal representative of the magnitude of an increase in the actual rate of penetration above the expected rate of penetration of said bit along an interval of depth of said borehole, said third means including:
  fourth means operably connected with said first and second means and responsive to said first and second signals for generating a fourth signal representative of change in the actual drilling rate during a drilling depth interval;
  and, fifth means operably connected with said second and fourth means and responsive to said second signal for generating a fifth signal representative of said drilling depth interval.

12. In a system for monitoring borehole conditions in a borehole being drilled with a drill string and drill bit therein and with drilling mud being circulated therethrough, the combination comprising:
  first means for monitoring the actual rate of penetration of said bit in said borehole and generating a first signal representative thereof;
  second means for monitoring the change in depth of said borehole and generating a second signal representative thereof;
  third means operably connected with said first and second means responsive to said first and second signals for generating a third signal representative of the magnitude of an increase in the actual rate of penetration above the expected rate of penetration of said bit along an interval of depth of said borehole;
  and fourth means operably connected with said first and third means and responsive to said first and third signals for generating a fourth signal representative of the calculated bottomhole differential pressure in said borehole during said drilling.

13. In a method of monitoring borehole conditions in a borehole being drilled with a drill string and drill bit therein and with drilling mud being circulated therethrough, the combination of steps comprising:
  monitoring the actual rate of penetration of said bit in said borehole and generating a first signal representative thereof;
  monitoring the change in depth of said borehole and generating a second signal representative thereof;
  generating a third signal responsive to said first and second signals and representing the magnitude of an increase in the actual rate of penetration above the expected rate of penetration of said bit along an interval of depth of said borehole, said step of generating said third signal includes:
  generating a fourth signal responsive to said first and second signals and representative of change in the actual drilling rate through a drilling depth interval;
  and generating a fifth signal responsive to said second and fourth signals and representative of said drilling depth interval.

14. In a method of monitoring borehole conditions in a borehole being drilled with a drill string and drill bit therein and with drilling mud being circulated therethrough, the combination of steps comprising:
  monitoring the actual rate of penetration of said bit in said borehole and generating a first signal representative thereof;
  monitoring the change in depth of said borehole and generating a second signal representative thereof;
  generating a third signal responsive to said first and second signals and representing the magnitude of an increase in the actual rate of penetration above the expected rate penetration of said bit along an interval of depth of said borehole;
  and, generating a fourth signal responsive to said first and third signals and representative of predicted bottomhole differential pressure in said borehole during said drilling.

References Cited
UNITED STATES PATENTS 3,368,400    2/1968    Jorden, Jr. et al. ____ 73—151.5

JERRY W. MYRACLE, Primary Examiner

U.S. Cl. X.R.

346—33 W

U. S. PATENT OFFICE

UNITED STATES PATENT OFFICE
CERTIFICATE OF CORRECTION

Patent No. 3,620,077            Dated January 12, 1972

It is certified that error appears in the above-identified patent and that said Letters Patent are hereby corrected as shown below:

Inventors: Morton E. Brown, Darrell W. Williams, and Albert B. Crownover, Jr.

Column 1, line 21, "therethroough" should read --therethrough--

Column 1, line 67, "an" should read --and--

Column 12, line 73, after "determining" insert --predicted--

Column 13, line 20, "calimed" should read --claimed--

Column 14, line 61, after "rate" insert --of--

Signed and sealed this 23rd day of May 1972.

(SEAL)
Attest:

EDWARD M. FLETCHER, JR.          ROBERT GOTTSCHALK
Attesting Officer                 Commissioner of Patents